April 11, 1961 H. STRASSER 2,978,778
MACHINES FOR TRIMMING APPENDAGES OR ARTICLES
Filed Sept. 20, 1956 6 Sheets-Sheet 2

Inventor
*Hans Strasser*

By
*William B. Kerr*
Attorney

Inventor
Hans Strasser

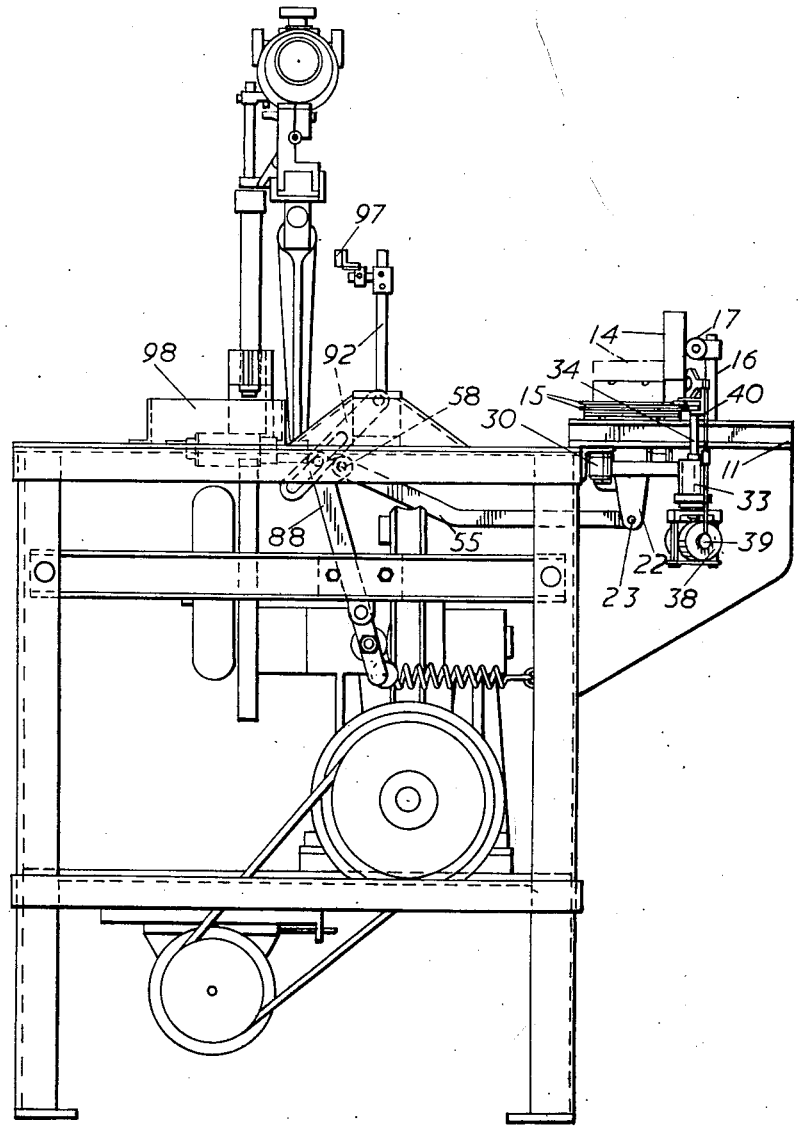

April 11, 1961 H. STRASSER 2,978,778
MACHINES FOR TRIMMING APPENDAGES OR ARTICLES
Filed Sept. 20, 1956 6 Sheets-Sheet 5

Inventor
*Hans Strasser*

By
*William B. Kerr*
Attorney

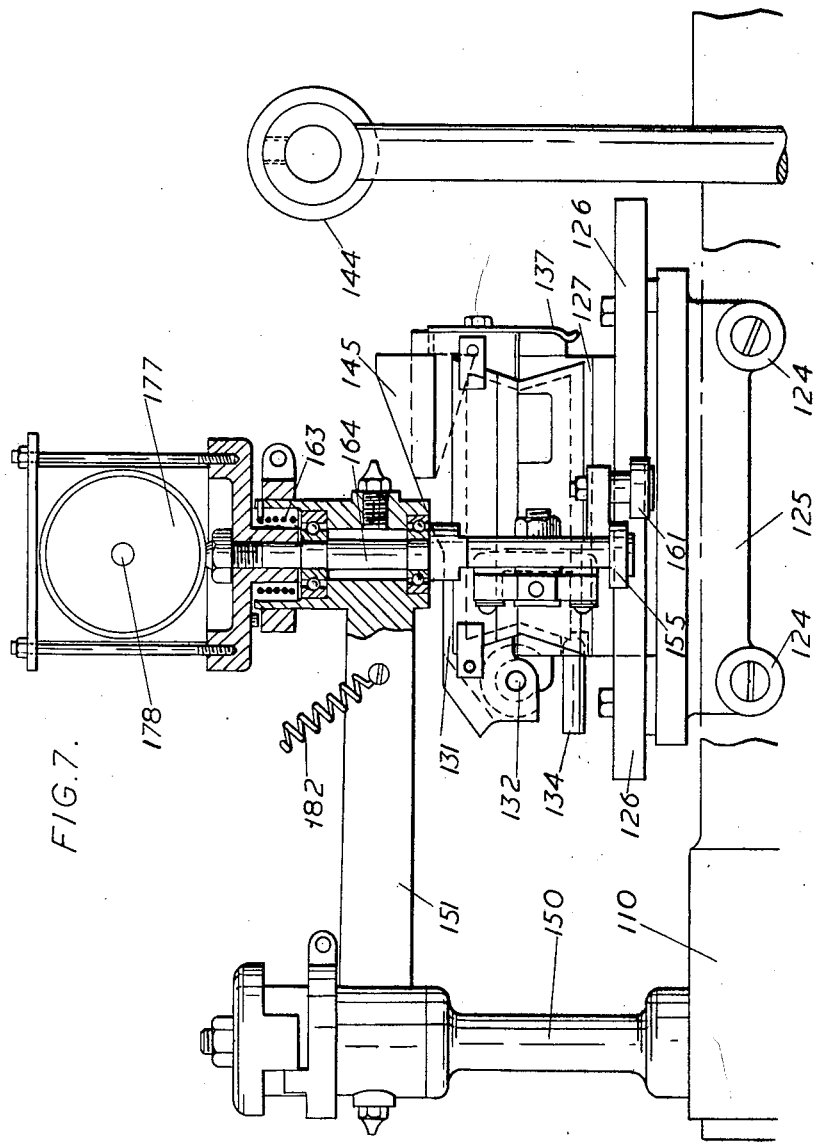

United States Patent Office 2,978,778
Patented Apr. 11, 1961

2,978,778

MACHINES FOR TRIMMING APPENDAGES OR ARTICLES

Hans Strasser, 94 Trent Valley Road, Penhull, Stoke-on-Trent, England

Filed Sept. 20, 1956, Ser. No. 611,071

6 Claims. (Cl. 25—108)

This invention relates to means for trimming appendages or articles, particularly but not necessarily exclusively ceramic appendages or articles.

When a cutting blade is made to travel through clay a considerable resistance to the movement of the blade is built up, and this is liable to cause the clay to break away in advance of the blade instead of achieving a clean cut. In the manufacture of pottery articles, for instance in trimming handles for attachment to cups, this is very undesirable, as it is important that the parts of the handle which are to adjoin the cup shall be trimmed to conform to the contour of the cup with the utmost precision. Moreover if the edges of the clay breakaway the result is unsightly.

Various machines or appliances have been devised for trimming cup handles and the like in which the trimming blade is made to travel in a predetermined path to produce a cutting stroke which is exactly conforming to the desired contour which it is required to produce, and this present invention is not confined to any particular form of device.

The specification of my prior American patent application Serial No. 368,096 now abandoned (British Patent No. 728,072) relates to a machine for attaching ceramic appendages such as cup handles, in which a cradle capable of holding a handle or the like is opened out hingedly to receive the handle and is then closed up to grip the handle and given a movement which causes the handle to be presented in the appropriate position to a cup or the like supported on a stationary chuck, there being a yielding component in the action by which the handle is pressed against the cup, the cradle being then opened out and returned in readiness for re-loading: the machine also includes means for trimming the handles to suit the contour of the cups, and means for applying slip to the handles before they are presented to the cups. The present invention may very advantageously be used in conjunction with this machine, that is to say, the trimming mechanism about to be described may be substituted in a machine according to specification No. 368,096 for the trimming mechanism described in that specification.

The specification of my prior American patent application Serial No. 380,577, now Patent No. 2,827,681 (British Patent No. 727,273) relates to machines for trimming ceramic appendages such as cup handles and consists of an endless conveyor carrying a number of handle-supporting units each comprising a cradle for holding a handle, and guide means corresponding to the contour of the cup, the handle-supporting units being carried by the conveyor successively through a cutting station where a trimming device controlled by the guide means acts upon each handle to produce on it the contour of the cup to which it is later to be attached. These cradles also consist of two parts hinged together, containing rubber or similar flexible members, and the guide means comprises a profile along which ride rollers forming part of the trimming device. The trimming device is in the form of a blade of the appropriate shape carried in a holder. The present invention may very advantageously be used in conjunction with this machine also.

Nevertheless the trimming mechanism about to be described may equally well be used in conjunction with other machines, or may be constructed as an independent machine for either manual or power operation.

According to the present invention a cutting device while making a cutting stroke in a guided path to produce on a clay article or other article or appendage the predetermined contour is simultaneously made to partake of an oscillatory movement of rather high frequency and small amplitude across the line of cut.

Both the amplitude and the frequency of the oscillatory motion are adjustable and may be derived from mechanical, electronic or any other convenient means. The blade may be mounted in any suitable way that will enable the oscillatory motion to be imparted to it without interfering with its guided action upon the clay: for example its oscillation may be made about a pivot.

Referring to the drawings which form a part of this specification:

Figure 5 is a similar view to Figure 1 showing a modification in which the apparatus is combined with a machine according to specification No. 368,096.

Figure 7 is a front view thereof, partly in section.

Figure 1:
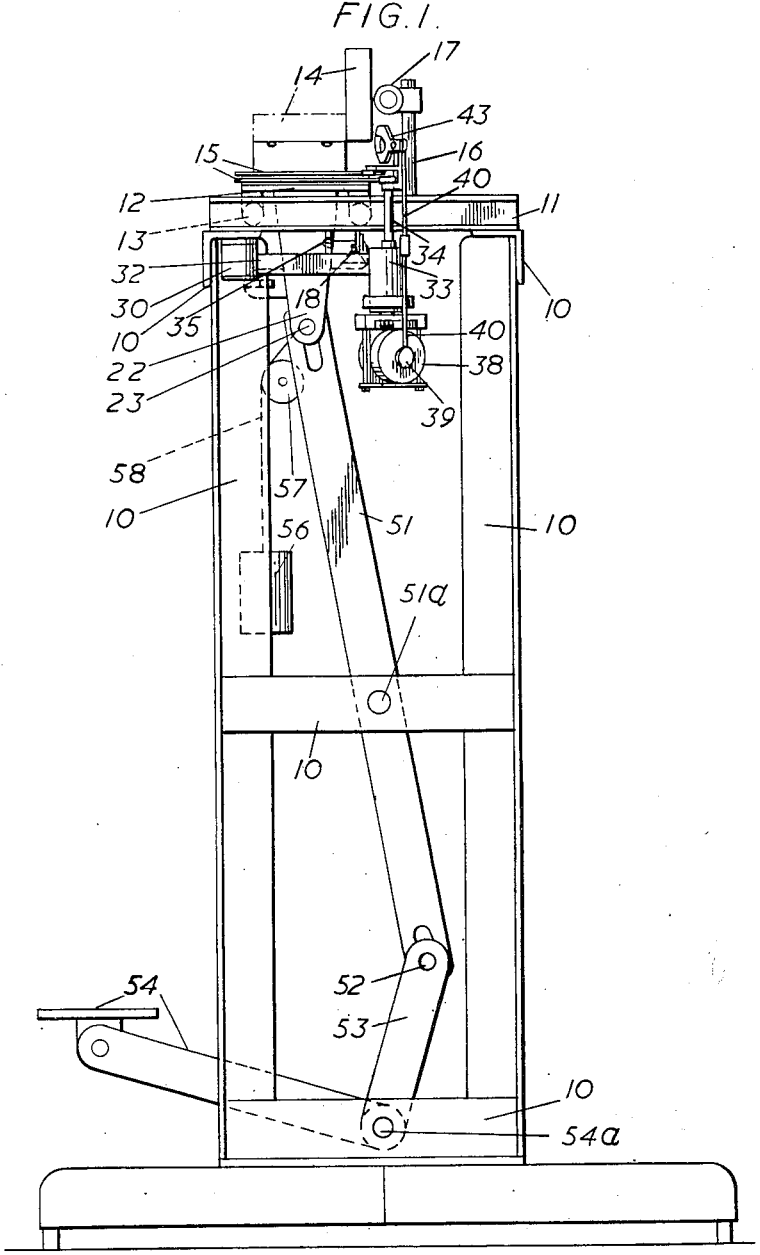
Figure 1 is a side elevation of an independent manually operated trimming machine.
Figure 2:
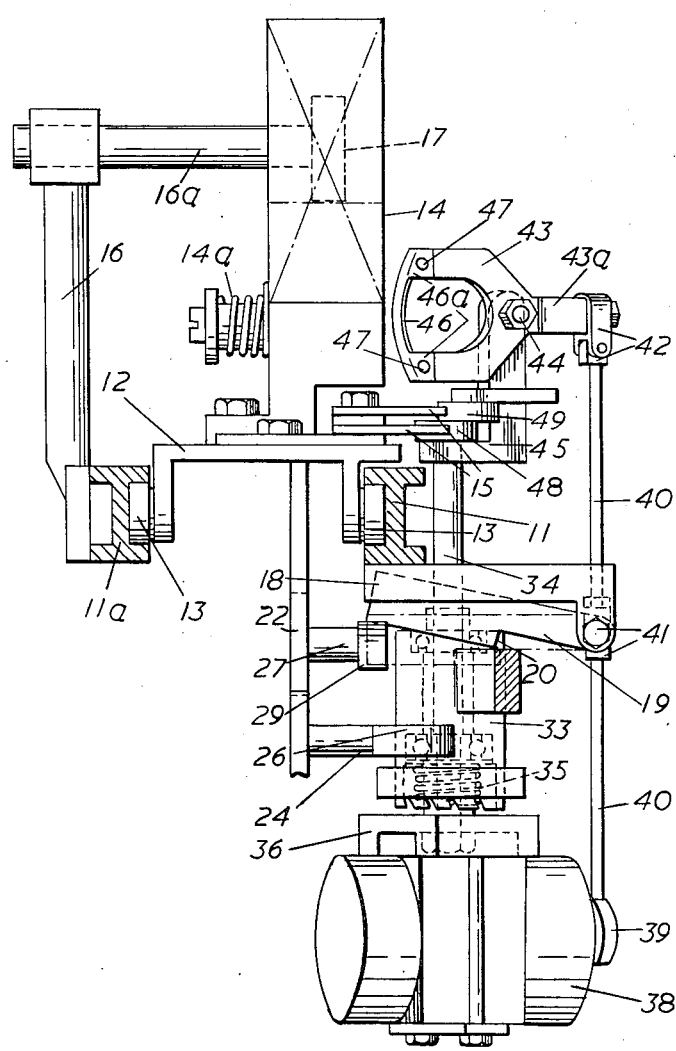
Figure 2 is a part sectional elevation at right angles to Figure 1 showing the cutting station.
Figure 4:
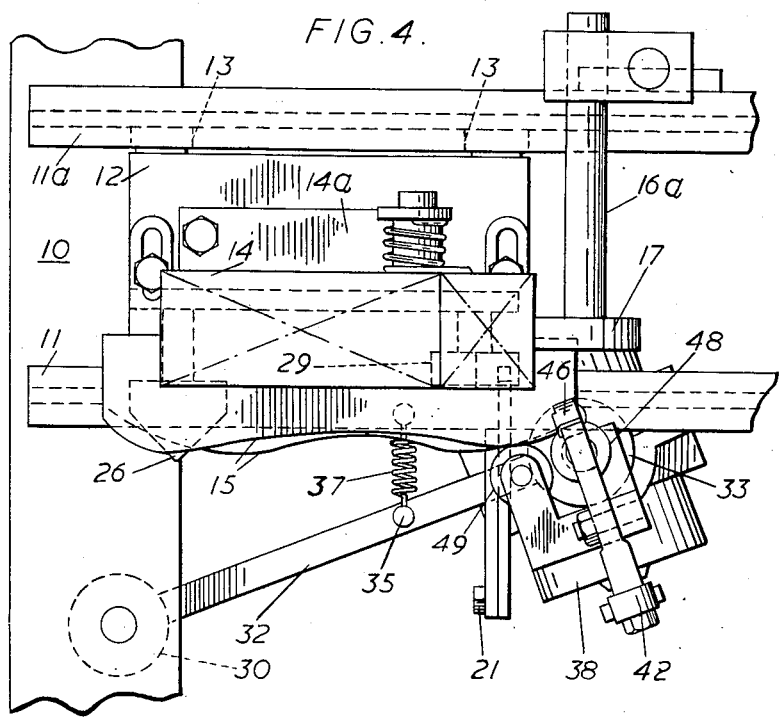
Figure 4 is a plan.
Figure 3:
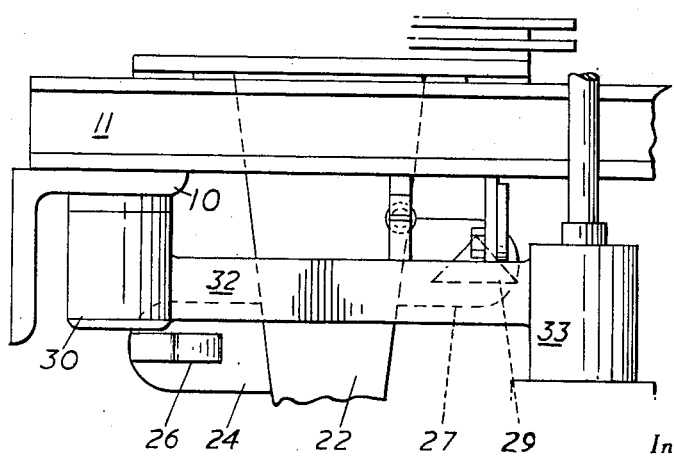
Figure 3 is a part elevation looking in the same direction as Figure 1.

In the present drawings the handle-supporting unit is the same as one of those described in the before-mentioned specification No. 380,577, but instead of being mounted on an endless conveyor it is now arranged to slide to and fro on the table 10 of the machine in two slide rails 11, 11$^a$. The handle supporting unit has a platform 12 carrying rollers 13 engaging in the rails 11, 11$^a$, and also supporting a cradle 14 which as before has two parts hinged together to hold the handle between them and opened by a spring 14$^a$; the cradle is only shown diagrammatically, but the profiles by which the cutting blade is guided during its cutting stroke are seen at 15. Attached to the slide rail 11$^a$ is a gallows or striker comprising a vertical column 16 with a horizontal arm 16$^a$ extending over the guide-way formed by the slide rails, and carrying a freely rotatable roller 17 which acts to close up the cradle at the appropriate moment during its travel after a handle has been inserted into it. The other slide rail 11 has attached to it a bracket 18 to which by means of a pin and slot connection 21 there is attached a catch 19 having a step or recess 20. Attached to the underside of the platform 12 is a depending bracket 22 having two extensions, one on each side of it, at different levels: the lower extension 24 carries a horizontally profiled cam 26 of approximately triangular shape: the higher extension 27 carries a vertically profiled cam 29 also of approximately triangular shape. Attached to the underside of one of the angles of the table top 10 is a pivot 30 upon which a horizontal arm 32 of oblong cross-section is pivotally mounted. This arm 32 carries the main vertical shaft 34 of the cutter assembly about which the cutter swivels during its cutting action against the action of a spring 35 located in the housing 33, or alternatively coil springs connecting the guide roller holder to the slide rail. The arm 32 is also connected to the slide rail 11 by a coil spring 37 anchored to a peg 35. The shaft 34 carries at its lower end a bracket 36 which in turn carries a fractional horse-power electric motor 38, the motor spindle being horizontal and having mounted on it an eccentric 39, with provision for varying the amount of eccentricity by which the eccentric operates a connecting rod 40, the effective length of which is regulated by a nut 41 engaging with the upper and lower parts of the rod. The upper end of the connecting rod is connected by means of a universal coupling joint 42 with the tailpiece 43ª of a U-shaped blade holder 43 across the front of which the cutting blade 46 is fixed, the blade having turned-over parts 46ª through which screws 47 are passed into the sides of the blade holder to hold the blade immovable. This blade holder 43 is mounted upon a horizontal pivot 44 in the upper end of a bracket 45 which forms the upper part of the vertical shaft 34 of the cutter assembly. The rollers 48, 49, which ride along the profiles 15 to maintain the blade in proper cutting relation with the handle, as in specification No. 380,577, are mounted on the bracket 45 and are held in contact with the profiles by the spring 37. The oscillation mechanism including the motor and the blade holder 43 follow the swivelling or turning movement of the main shaft 34 of the cutting unit by which the motor 38 is carried. The handle holder unit slides backwards and forwards by the action of operating means attached by the pivot 23 to the depending bracket 22 on the underside of the cradle platform 12. Referring to the machine illustrated in Figures 1, 2, 3 and 4, a rocking lever 51 working on a fixed pivot 51ª has its upper end connected to the pivot 23 and its lower end connected by a pivot 52 to an operating link 53. The lever 51 is provided with slotted connections with the pivots 23, 52 to allow for operation. The link 53 and lever 51 are actuated by a treadle device or foot lever 54 connected to the link 53 by a fixed pivot 54ª. A counterweight 56 working over a pulley 57 by means of a cable 58 opposes the movement of the cradle into the cutting station, and acts to return the cradle after the trimming operation back to its forward position, as shown in Figure 1, for unloading and re-loading. During its cutting stroke, as it is guided along the profiles 15 by the rollers 48, 49, the cutting unit including the blade 46 partake of a high frequency oscillation derived from the eccentric 39. The frequency is governed by the speed of the motor, which may be of the order of 3000 revolutions per minute; the amplitude is regulated by the amount of throw of the eccentric (which can be changed if necessary) and by the adjusting nut 41 on the connecting rod 40. The cutting blade 46 will preferably be of a rather thicker and stronger type than the wafer blades hitherto customary in these machines, so that they will not need to be replaced at such frequent intervals. At the conclusion of the cutting stroke the cam 26 pushes the housing 33 and shaft 34 away from the line of cut and the arm 32 registers with the recess or step 20 in the pivoted catch 19 to hold the cutter assembly clear of the trimmed handle as the cradle platform 12 returns, whereupon the cam 29 acts to lift the catch 20 and release the arm 32, whereupon the cutter assembly returns to the cutting position under the action of the spring 37. As in specification No. 380,577 a lever may be arranged to press upwardly on the rubber part of the cradle to facilitate the removal of the handles. When it is required to change over from one shape of handle to another it may be convenient to remove the platform 12 and cradle unit complete and exchange it for another with a differently shaped handle recess and different profiles, or alternatively only the profiles and the recessed rubber insert in the cradle which holds the handle may be exchanged, It will be evident that instead of the manual operating means already described the bracket 22 may be power-operated, for example by a cam.

Moreover, instead of the apparatus being an independent machine as described, it may as already stated be combined with a machine for fixing the handles to the cups, and Figure 5 shows this arrangement applied to a machine as described in specification No. 368,096, replacing the trimming mechanism described in that specification. The apparatus as a whole is the same as already described but the bracket 22 and pivot 23 are operated by a level 55 connected by a pivot 58 to the lever 88 described and designated by the same reference numeral in the aforesaid prior specification, which through the further lever device 92 operates the slip applying means 97 to lift it out of the slip container 98 and present it to the handle. The movement of the trimming mechanism is preferably so synchronised with the movement of the handle attaching mechanism that a handle can be trimmed in the trimming mechanism while at the same time a previously trimmed handle is being dealt with by the attaching mechanism, the operator transferring trimmed handles from the trimming mechanism to the attaching mechanism and feeding fresh handles to the trimming mechanism.

Figure 6:
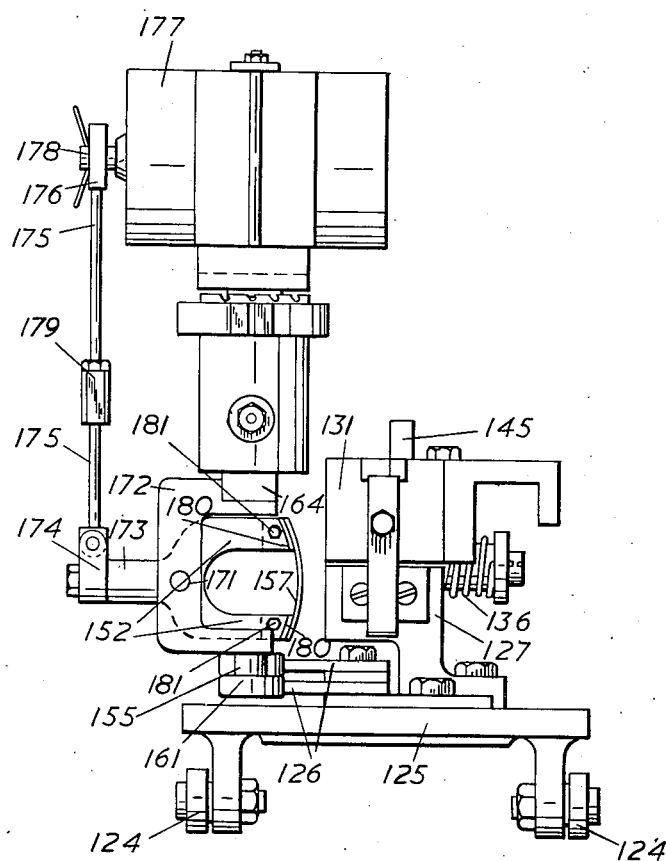
Figure 6 is an end elevation showing another modification in which the apparatus is combined with a machine according to specification No. 380,577.

A somewhat different form of apparatus is shown in Figures 6 and 7 where the machine as a whole follows the lines described in specification No. 380,577 and the drawings therefore only show the cutting station and such parts as are relevant to it.

The handle-supporting units each comprise a base or platform 125 carrying guide rollers 124 and a profile 126, together with a cradle having a fixed base 127 and a movable part 131 hinged at 132 to the fixed base 127. The cradle has a ramp 145 which is engaged by a striker 144 to close it against the action of a spring 136 as it moves towards the cutting station, and it is held closed by a clip 137. A lever 134 may be arranged to press on the rubber part of the cradle to facilitate the removal of the handles. The cutting unit comprises a vertical pillar 150 supported on the frame 110 of the machine and having an arm 151 carrying the spindle 164 about which the cutting device swivels, under the control of the spring 163, as its guide rollers 155, 161 ride along the profile 126. The cutting blade 157 is mounted in a holder 152. All these parts are similar to corresponding ones described in specification No. 380,577. According to the present invention the blade holder 152 is itself pivotally mounted for oscillating movement about a horizontal axis 171 in a further holder 172 which forms part of the vertical spindle 164. The blade holder is provided with a tailpiece 173 which is connected by a universal coupling joint 174 with a connecting rod 175, the other end of which is attached to an eccentric 176 with provision for varying the amount of eccentricity, actuated by a fractional horse power electric motor 177 mounted on top of the spindle 164 aforesaid, so that the oscillation mechanism including the motor and blade holder 152 follow the swivelling or turning movement of the spindle. The horizontal spindle 178 of the motor 177 drives the eccentric at a speed governed by the speed of the motor, and the setting of the eccentric 176 governs the amplitude of the oscillation given to the connecting rod 175; the latter has a screwed adjustment 179 coupling together upper and lower parts of the rod so that its effective length can be varied. Thus the amplitude of the oscillation imparted through the universal joint 174 to the blade holder 152 can be altered to suit different conditions or needs, for instance due to different shapes of handle or different clay bodies. The blade 157 may again be of a stouter type than a wafer blade and it may have turned-over edges 180 at top and bottom which fit round the sides of the blade holder and have screws 181 passed through them to secure the blade immovably to the holder. The cutting edge of the blade is preferably positioned on the centre line of the spindle 164. The arm 151 which carries the cutter assembly may have a spring 182 connected to it and to a suitable bolt or the like on the frame of the machine, and alternatively to the spring loading 163 aforesaid coil springs connecting the guide roller holder to a suitable bolt or the like.

By means of this improved oscillating cutter action the predetermined contour is imparted to the cut surface or surfaces as required, but in producing that cut the cutting device is continually making rapid to and fro movements across the line of cutting, and my experiments lead me to believe that in this way a cleaner and more accurate cutting action will be achieved and the danger of the clay being broken will be reduced if not entirely obviated. Moreover my experiments suggest that it is possible to use clay handles in various conditions, from soft to hard, with equal success, which has caused difficulties hitherto.

It is possible that the oscillatory movement may be contrived in other ways, besides movement about a pivot. It is necessary that the oscillation shall be cleanly and accurately across the cut face of the clay but subject to this requirement the invention is not restricted to any particular method of producing the movement. It is also possible that it might be preferred in some cases to cause the cutter assembly to move to and fro or in a suitable path and to have the cradle or holder assembly non-travelling. It is also possible that the invention may be useful for trimming other clay articles besides cup handles, for instance in scalloping edges of ware.

I claim:

1. In a machine for trimming, particularly clay articles, having a holder for the article, guide means on said holder, the article holder and guide means being movably positioned on a structural support, means moving the article-holder and the guide means to and fro, and an arm having a blade holder for a cutting blade pivotally mounted in spaced relation to the article holder, a cutting blade carried in the blade holder, a support in which the blade holder is pivotally supported, a structure carrying the support, guide rollers carried by the blade holder operatively engaging with the guide means of the article-holder and acting on the blade holder whereby said cutting blade is constrained to make a cutting stroke in a predetermined path and produce a predetermined contour upon the article, a motor structurally attached to the blade holder attached to said structure, an eccentric driven by said motor and a reciprocatable shaft operatively connected to said eccentric and said blade holder, said eccentric imparting to the blade holder an oscillatory movement of high frequency and low amplitude whereby said cutting blade is oscillated transverse to the line of cut simultaneously with the said guided cutting stroke.

2. A cutting blade according to claim 1 in which the eccentric comprises a cam driven by the motor.

3. A cutting blade according to claim 2 having means for altering the frequency of the oscillatory movements which are imparted to the blade holder.

4. A cutting blade according to claim 2 having means for altering the amplitude of the oscillatory movements which are imparted to the blade holder.

5. A cutting blade according to claim 2 having a single means for altering the frequency and amplitude of the oscillatory movement of the cutting blade.

6. In a machine for trimming clay articles having a holder for the article, a holder having a cutting blade mounted in spaced relation to the article holder, a support in which the blade holder is pivotally supported, a structure carrying said support, a cutting blade carried in the blade holder, means connecting said holders for creating relative travel between the article-holder and the blade holder, and guide means on the article holder engaging with the blade holder whereby, during said relative travel, said cutting blade is constrained to make a cutting stroke in a predetermined path and produce a predetermined contour upon the article, and a vibratory device mounted on said support, a connection between the vibratory device and the blade holder, imparting to the blade holder an oscillation of high frequency and low amplitude whereby said cutting blade is oscillated across the line of cut simultaneously with the cutting stroke.

References Cited in the file of this patent

UNITED STATES PATENTS

| | | |
|---|---|---|
| 2,309,726 | Zalewski et al. | Feb. 2, 1943 |
| 2,413,540 | Bloore | Dec. 31, 1946 |
| 2,558,318 | Sebell | June 26, 1951 |
| 2,619,701 | Jordon | Dec. 2, 1952 |

FOREIGN PATENTS

| | | |
|---|---|---|
| 584,582 | Great Britain | Jan. 17, 1947 |
| 728,072 | Great Britain | Apr. 13, 1955 |